(12) United States Patent
Cheon et al.

(10) Patent No.: US 7,955,736 B2
(45) Date of Patent: Jun. 7, 2011

(54) SECONDARY BATTERY

(75) Inventors: Sang-Eun Cheon, Suwon-si (KR); Hwa-Young Won, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1343 days.

(21) Appl. No.: 11/155,543

(22) Filed: Jun. 20, 2005

(65) Prior Publication Data

US 2005/0287428 A1 Dec. 29, 2005

(30) Foreign Application Priority Data

Jun. 23, 2004 (KR) .................. 10-2004-0047012

(51) Int. Cl.
*H01M 4/70* (2006.01)
(52) U.S. Cl. ................... 429/233; 429/94; 429/211
(58) Field of Classification Search .............. 429/94, 429/211, 233, 243
See application file for complete search history.

(56) References Cited

U.S. PATENT DOCUMENTS

| | | | | |
|---|---|---|---|---|
| 3,761,314 A | * | 9/1973 | Cailley | .............. 429/94 |
| 2005/0142436 A1 | * | 6/2005 | Arai et al. | .............. 429/94 |

FOREIGN PATENT DOCUMENTS

| | | | |
|---|---|---|---|
| JP | 46-34821 | | 10/1971 |
| JP | 47-1520 | | 1/1972 |
| JP | U62-7157 | | 1/1987 |
| JP | 11-219694 | | 8/1999 |
| JP | 2000077054 A | * | 3/2000 |
| JP | 2000-348757 | | 12/2000 |
| JP | 2003-007346 | | 1/2003 |
| JP | 2003-022842 | | 1/2003 |
| JP | 2004-095487 | | 3/2004 |
| JP | 2004-172038 | | 6/2004 |

OTHER PUBLICATIONS

Machine Translation for Kasahara et al., JP 2004-095487. Mar. 25, 2004.*

* cited by examiner

*Primary Examiner* — Tracy Dove
(74) *Attorney, Agent, or Firm* — Robert E. Bushnell, Esq.

(57) ABSTRACT

A secondary battery includes: a case; an electrode assembly including a positive electrode, a negative electrode, and a separator interposed therebetween, the electrode assembly being arranged within the case; a cap assembly affixed to the case and adapted to seal the case, the cap assembly being electrically connected to the electrode assembly; and a pair of current collecting plates adapted to be respectively electrically connected to the positive and negative electrodes. Each electrode includes an un-coated region absent an active material, the un-coated region of each electrode contacting its respective current collecting plate. Each un-coated region includes a plurality of independent regions separated from one other, the plurality of independent regions being bent and affixed to their respective current collecting plate.

5 Claims, 6 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY AND ELECTRODES ASSEMBLY earlier filed in the Korean Intellectual Property Office on 23 Jun. 2004 and there duly assigned Serial No. 10-2004-0047012.

BACKGROUND OF THE INVENTION

1. Field of the Invention

The present invention relates to a secondary battery, and more particularly, to an electrode of an electrode assembly of a secondary battery.

2. Description of the Related Art

According to usage and battery capacity, secondary batteries are classified into low-capacity secondary batteries, which are referred to as "small batteries" hereinafter, that use a single battery cell packaged in the form of a pack, and high-capacity secondary batteries, which are referred to as "large batteries" hereinafter, that use scores of battery cells packaged into a battery pack for driving a motor.

Small batteries are used as the power source for small electronic devices, such as mobile phones, laptop computers, and camcorders, while large batteries are used as the power source for driving motors in hybrid electric vehicles and the like.

Depending on the external shape, small batteries may be classified into different types, such as square and cylindrical batteries. A small battery generally includes a positive electrode, a negative electrode, and a separator that is interposed as an insulator between the positive electrode and the negative electrode, that are spiral-wound to thereby form an electrode assembly. The electrode assembly is inserted into a cylindrical case to form the battery.

Each of the positive and negative electrodes of a secondary battery is provided with a conductive lead element for collecting current generated in positive and negative electrodes during the operation of the secondary battery. The lead element induces current generated in the positive and negative electrode to positive and negative terminals.

When the structure of the small battery is directly applied to a large battery, the operational characteristics of the large battery are not fulfilled with respect to electric capacity and power output. Therefore, a multi-tab structure using a plurality of tabs which are attached to an electrode assembly has been suggested in Japanese Laid-open Patent Application No. 2003-7346. This battery has a plurality of tabs along one direction of electrode assembly and the tabs are combined with an internal terminal which is connected to an external terminal.

However, such a multi-tab structure is required for many working processes. Especially, the tab has a small unit area and thus limitations for satisfying the output power characteristics required for large batteries.

Another form of the lead element is a current collecting plate. Since the current collecting plate has a wider unit area than the tap, it can have an increased current collecting efficiency and a higher energy density per unit area than the tap by reducing the space occupied by the tap in the case.

The current collecting plate, however, has a shortcoming that it is not fixed on an electrode assembly firmly. To be specific, the current collecting plate is usually affixed to the electrode assembly mainly by welding. If the electrode assembly is formed in a shape of a jelly-roll by winding a positive electrode, a negative electrode and a separator, and a current collecting plate is fixed on the electrode assembly by welding, the contact area between the current collecting plate and the electrode assembly is relatively small in the outer part, compared to the contact area in the central part of the electrode assembly. Therefore, the welding is not carried out properly in the outer part and this makes the connection between the current collecting plate and the electrode assembly unstable.

SUMMARY OF THE INVENTION

In order to obviate the problems described above, it is an aspect of the present invention to provide a secondary battery with a lead element firmly affixed to the electrode assembly, the lead element electrically connected to the electrode assembly.

It is another aspect of the present invention to provide a secondary battery including: a case; an electrode assembly including a positive electrode, a negative electrode, and a separator interposed therebetween, the electrode assembly being arranged within the case; a cap assembly affixed to the case and adapted to seal the case, the cap assembly being electrically connected to the electrode assembly; and a pair of current collecting plates adapted to be respectively electrically connected to the positive and negative electrodes; wherein each electrode includes an un-coated region absent an active material, the un-coated region of each electrode contacting its respective current collecting plate; and wherein each un-coated region includes a plurality of independent regions separated from one other, the plurality of independent regions being bent and affixed to their respective current collecting plate.

The plurality of independent regions preferably include portions of the respective un-coated region slit at arbitrary intervals in a longitudinal direction of the un-coated region.

The widths of the independent regions preferably become gradually wider from one side of the respective electrode to the other side of the electrode in the longitudinal direction of the electrode.

The widths of the independent regions are preferably narrower in a central part of the electrode assembly than in an outer part of the electrode assembly.

Each un-coated region preferably includes a dependent region adapted to connect its independent regions to form one body.

The dependent regions are preferably bent.

The independent regions are preferably bent toward a center of the electrode assembly.

The independent regions preferably include convex and concave portions arranged in a line end of their respective un-coated region in a longitudinal direction of the un-coated region.

The widths of the independent regions preferably become gradually wider from one side of the respective electrode to the other side of the electrode in the longitudinal direction of the electrode.

The widths of the independent regions are preferably narrower in a central area of the electrode assembly than in an outer part of the electrode assembly.

The convex portions preferably include an angled shape.

The convex portions alternatively preferably include a round shape.

The electrode assembly preferably includes a jelly-roll configuration.

The secondary battery preferably includes a cylindrical battery.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, the following embodiments of the invention have been shown and described, simply by way of illustration. As will be realized, the present invention is capable of modification in various respects, all without departing from the scope of the present invention. Accordingly, the drawings and description are to be regarded as illustrative in nature, and not restrictive.

Figure 1:
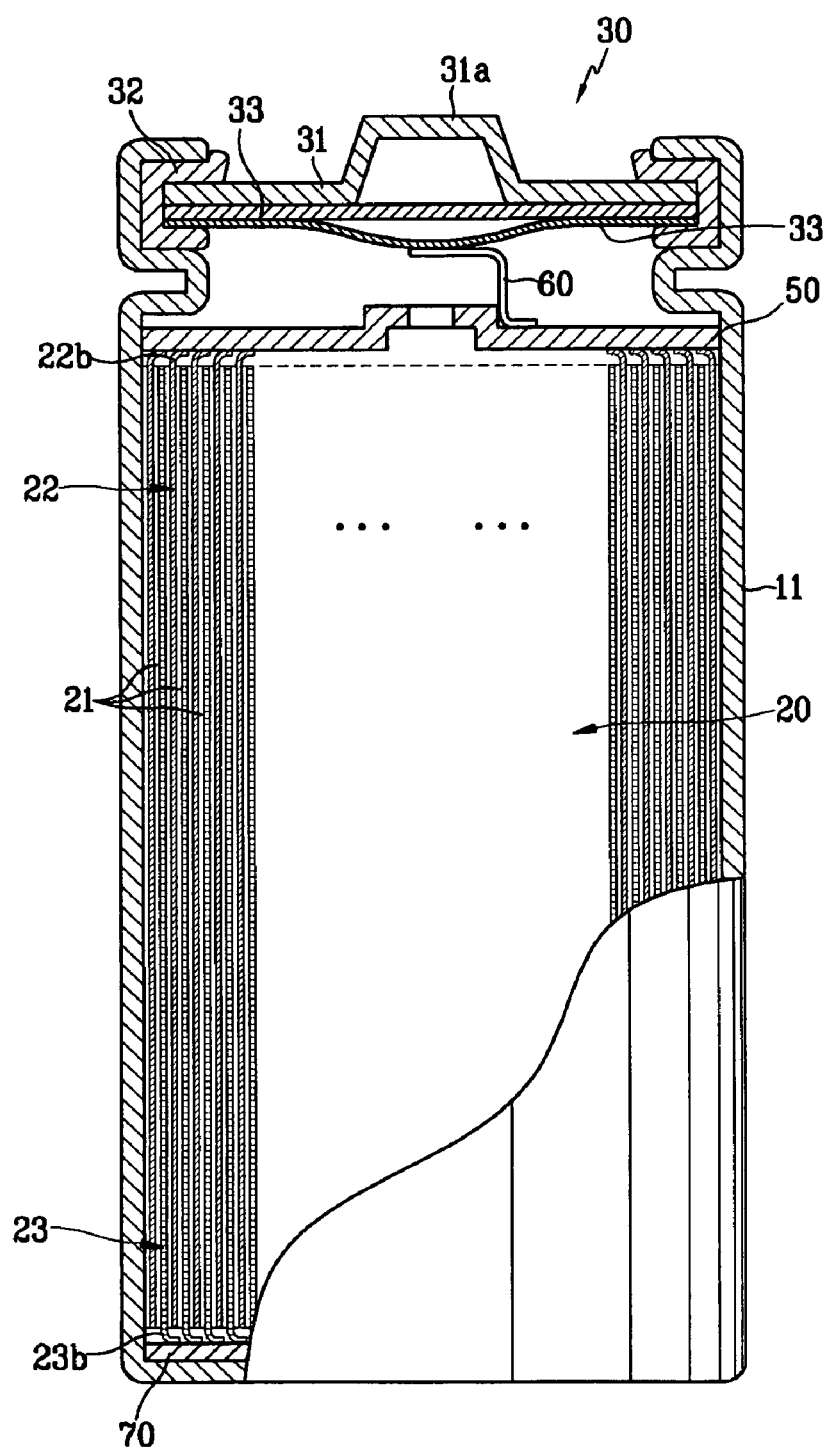
FIG. 1 is a cross-sectional view of a secondary battery in accordance with an embodiment of the present invention.

FIG. 1 is a cross-sectional view of a secondary battery in accordance with an embodiment of the present invention.

In the present embodiment, the secondary battery has a shape of a cylinder or a hexahedron, and it is formed by arranging an electrode assembly 20, which is formed by interposing an insulating separator 21 between a positive electrode 22 and a negative electrode 23 and winding them, into a case 11 having an opening and sealing the opening of the case 11 with a cap assembly 30 and a gasket 32.

The case 11 is formed of conductive metal, such as aluminum, an aluminum alloy, and nickel-plated steel. Preferably, the case 11 is formed in a cylindrical shape having a space for housing the electrode assembly 20, but the present invention is not limited to this shape.

The electrode assembly 20 is formed by interposing the separator 21 between the positive electrode 22 and the negative electrode 23 and winding them together. The positive electrode 22 and the negative electrode 23 respectively have un-coated regions 22b and 23b, that is, regions not having a coating of an active material. The positive un-coated region 22b and the negative un-coated region 23b are respectively connected to a positive current collecting plate 50 and a negative current collecting plate 70 for collecting current.

FIG. 1 is a view of an example where the jellyroll-type electrode assembly 20 is arranged in the case 11 and, hereinafter, the present invention is described based on this example. However, the present invention is not limited to this example.

The cap assembly 30 is provided with a cap plate 31 having an external terminal 31a and the gasket 32 for insulating the case 11 from the cap plate 31. The cap assembly 30 includes a space for buffering internal pressure and it can further include a vent plate 33 having a safety valve which is ruptured at a predetermined pressure level and releases gas to thereby prevent the battery from exploding. The safety valve is not limited to being formed in the vent plate 33 but rather any location is possible as long as the safety valve can electrically disconnect the electrode assembly 20 from the external terminal 31a at the predetermined pressure level.

The gasket 32, which is formed of an insulating material, not only seals the case 11 but also electrically insulates the cap assembly 30, which forms a positive pole, from the case 11, which forms a negative pole.

The cap assembly 30 is electrically connected to the electrode assembly 20 of the present invention via a lead line 60.

Figure 2:
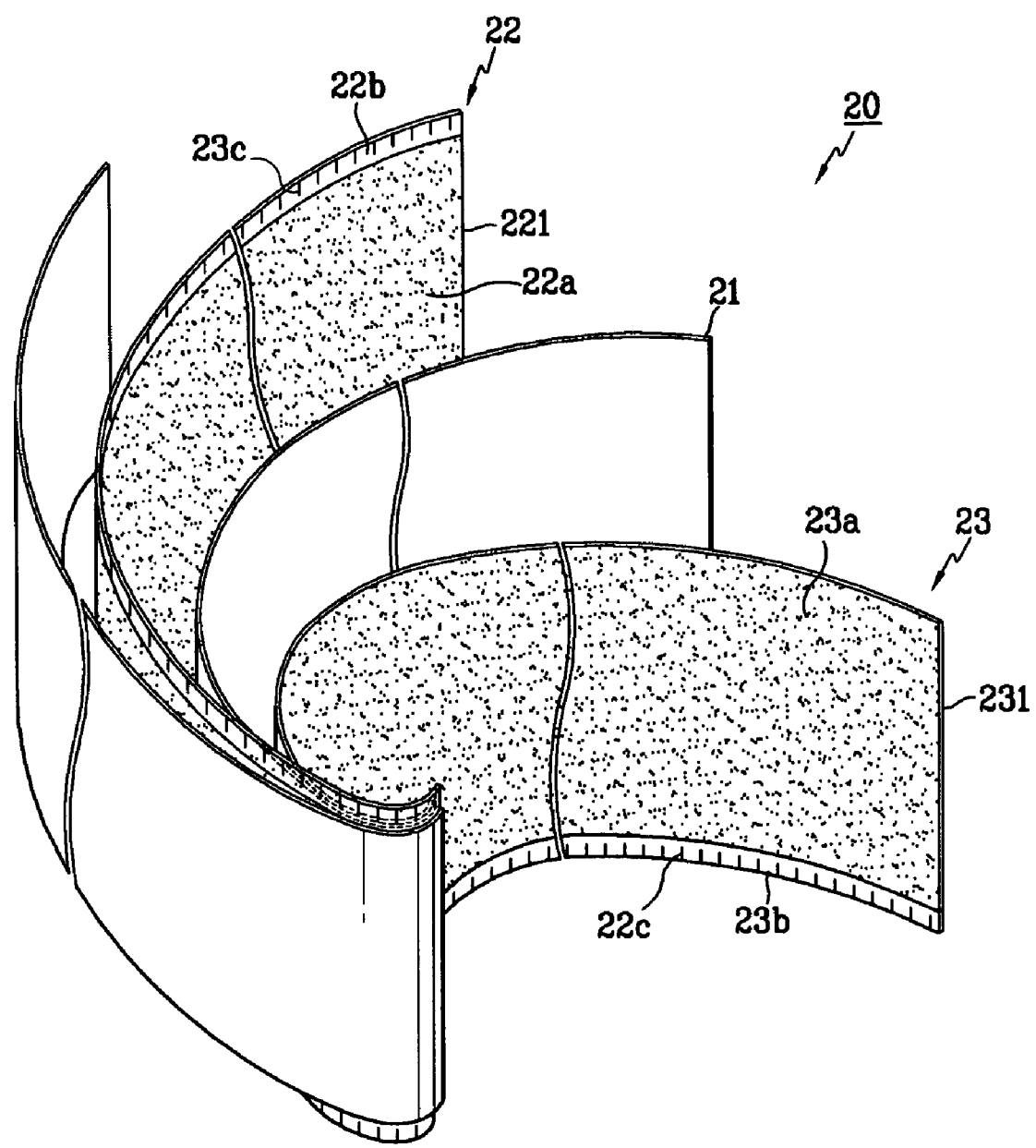
FIG. 2 is an exploded perspective view of an electrode assembly in accordance with an embodiment of the present invention.

Referring to FIG. 2, the electrode assembly 20 is formed by interposing the separator 21 between the positive electrode 22 and the negative electrode 23 and winding them together. The positive electrode 22 and the negative electrode 23 are formed by respectively coating positive and negative current collectors 221 and 231 with corresponding active materials 22a and 23a. The active materials are not applied to the edge of one side of the current collectors 221 and 231, and the regions not coated with the active materials are referred to hereinafter as un-coated regions 22b and 23b.

The positive un-coated region 22b and the negative un-coated region 23b are arranged opposite to each other after the electrode assembly 20 is completed, and protrude from the separator 21.

With the electrode assembly 20 formed as above, a positive current collecting plate 50 is arranged to contact the positive un-coated region 22b and a negative current collecting plate 70 is arranged to contact the negative un-coated region 23b. The collecting plates 50 and 70 are respectively electrically connected to the un-coated regions 22b and 23b by laser welding, for example.

In order to minimize contact resistance between the un-coated regions 22b and 23b and the current collecting plates 50 and 70, the un-coated regions 22b and 23b are bent toward the center of the electrode assembly 20 so that they contact the current collecting plates 50 and 70 face to face.

Figure 3:
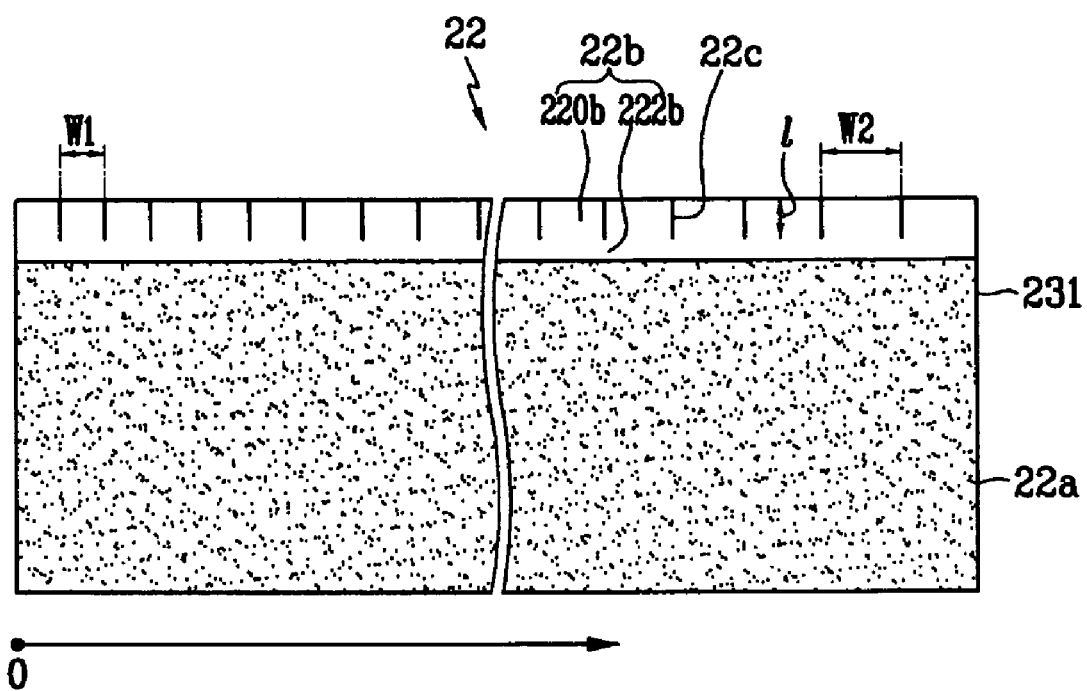
FIG. 3 is a plane view of a positive electrode in accordance with an embodiment of the present invention.

FIG. 3 is a plane view of the electrodes of the electrode assembly in accordance with an embodiment of the present invention. Since the positive electrode 22 and the negative electrode 23 have the same shape, they will be described with reference to the positive electrode 22 hereinafter for the sake of convenience. The description of the positive electrode 22 also applies to the negative electrode 23.

Referring to the FIG. 3, the un-coated region 22b formed along a line end of the positive electrode 22 is cut in a longitudinal direction at arbitrary intervals. That is, part of the un-coated region 22b is partially cut by slits 22c having an arbitrary length 1. Thus, the un-coated region 22b has a plurality of independent regions 220b which are separated from each other and form different bodies of their own and a dependant region 222b which connects the independent regions 220b and form one body.

The independent regions 220b are where the positive current collecting plate 50 substantially contacts the positive electrode 22 and gets attached thereto by welding, when the positive electrode 22 is electrically connected to the positive current collecting plate 50.

Figure 4:
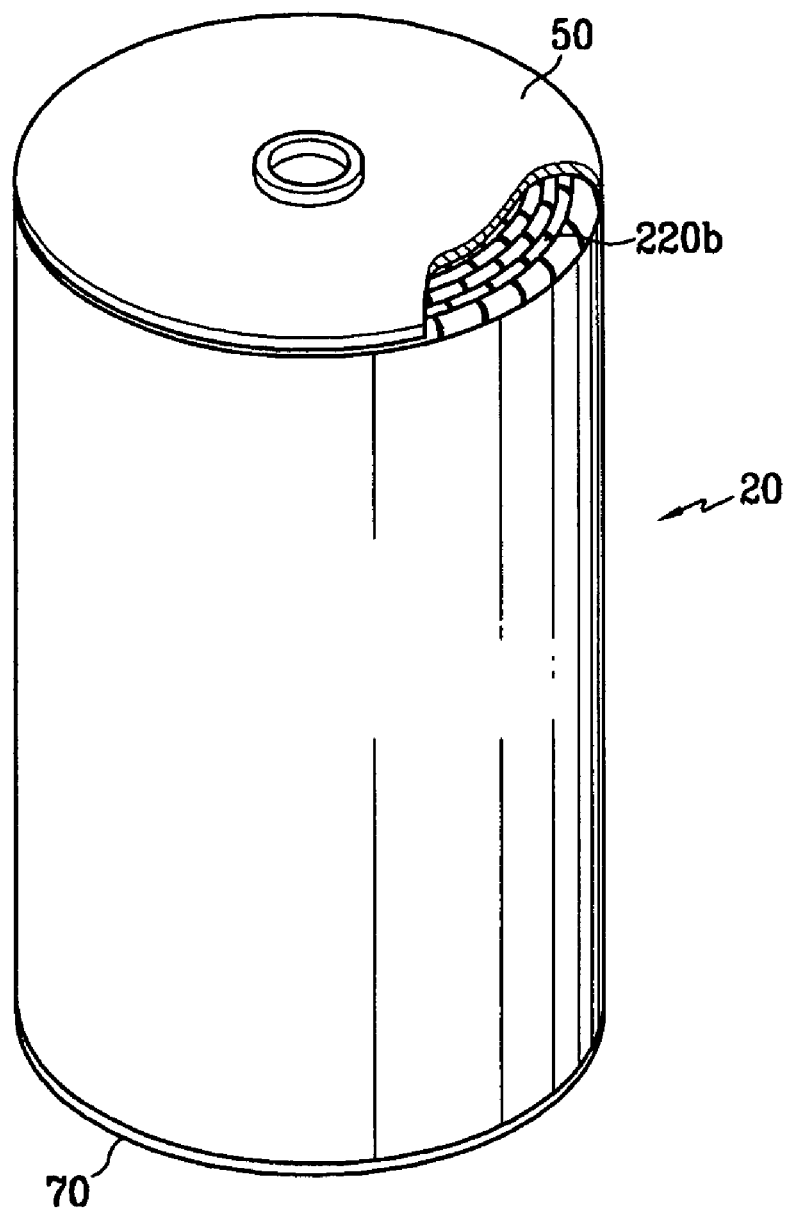
FIG. 4 is a perspective view of a current collecting plate connected to the electrode assembly in accordance with an embodiment of the present invention.
Figure 5:
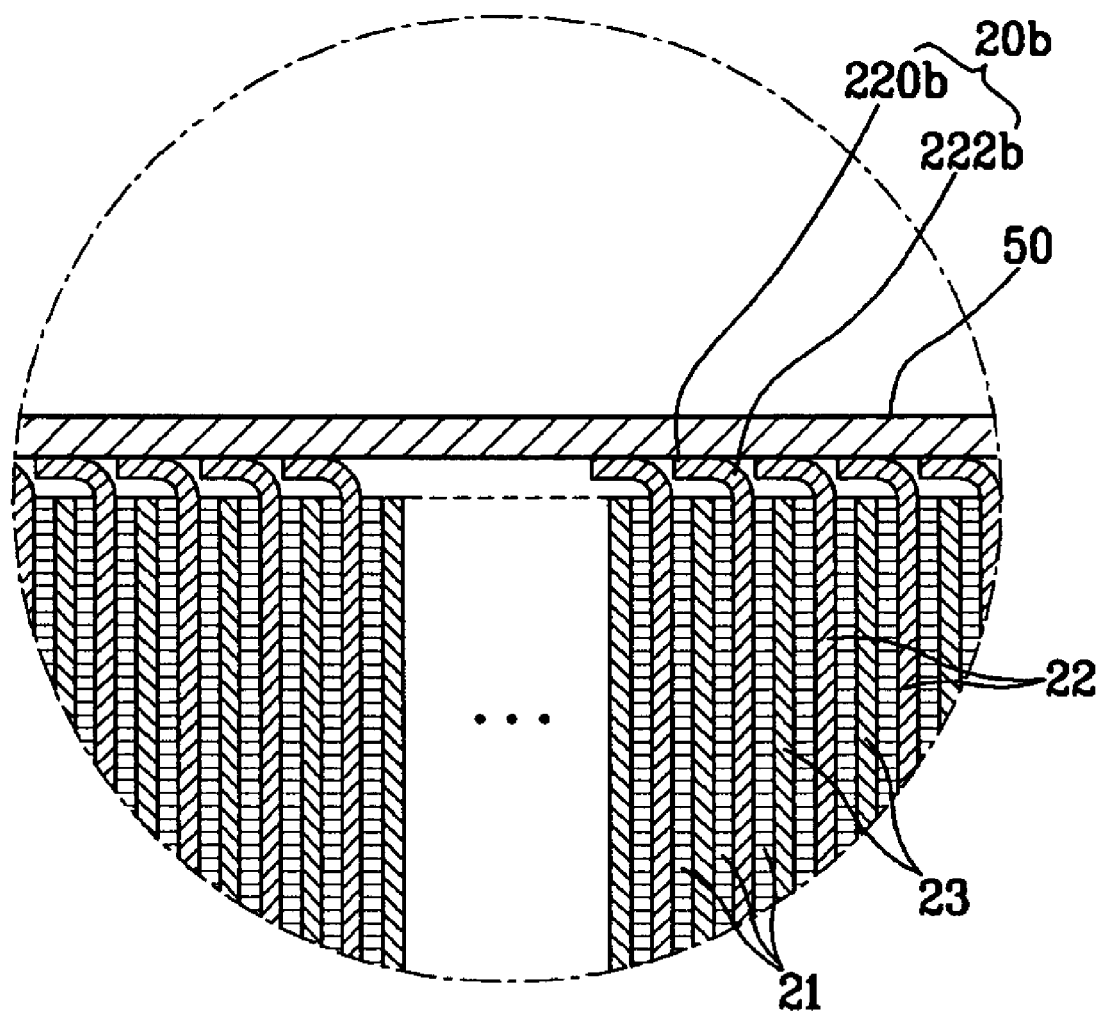
FIG. 5 is a cross-sectional view of how a positive electrode is connected to a current collecting plate in accordance with a modified embodiment of the present invention.

To be more specific, the independent regions 220b are the part that is bent toward the center of the electrode assembly 20 and contacts and gets attached to the positive current collecting plate 50 face to face, when the electrode assembly 20 is completed (see FIG. 4).

In accordance with the present embodiment, since the independent regions 220b can freely move with the slits 22c between them, they can be collectively bent toward the center of the electrode assembly 20 to thereby widen the contact area with the positive current collecting plate 50.

The independent regions 220b can be formed by widening or narrowing the width gradually in the longitudinal direction of the positive electrode 22. The independent regions 220b of the present embodiment are formed to have the width gradually narrowed as they go from the outer part of the electrode assembly 20 to the center (O) part.

The widths of the independent regions 220b are narrow (W1) in the central part of the electrode assembly 20 and wide (W2) in the outer part of the electrode assembly 20 in consideration that the circumference of the electrode assembly 20 becomes larger as it goes toward the outer part of the electrode 20, when the electrode assembly 20 is formed by winding the positive electrode 22 in the form of jelly-roll and the independent regions 220b are bent toward the center of the electrode assembly 20. Thus, the independent regions 220b can be bent in a fine state without being squashed or entangled, and the contact area to the positive current collecting plate 50 can be widened.

Therefore, the positive electrode 22 can contact the positive current collecting plate 50 electrically and mechanically due to the positive un-coated region 22b having the above structure without any problem.

When the positive un-coated region 22b contacts the positive current collecting plate 50, not only the independent regions 220b but also the dependent region 220b of the positive un-coated region 22b can be bent and contact the positive current collecting plate 50. The contact area between the positive un-coated region 22b and the positive current collecting plate 50 can be widened further and the current collecting efficiency can be improved.

Figure 6:
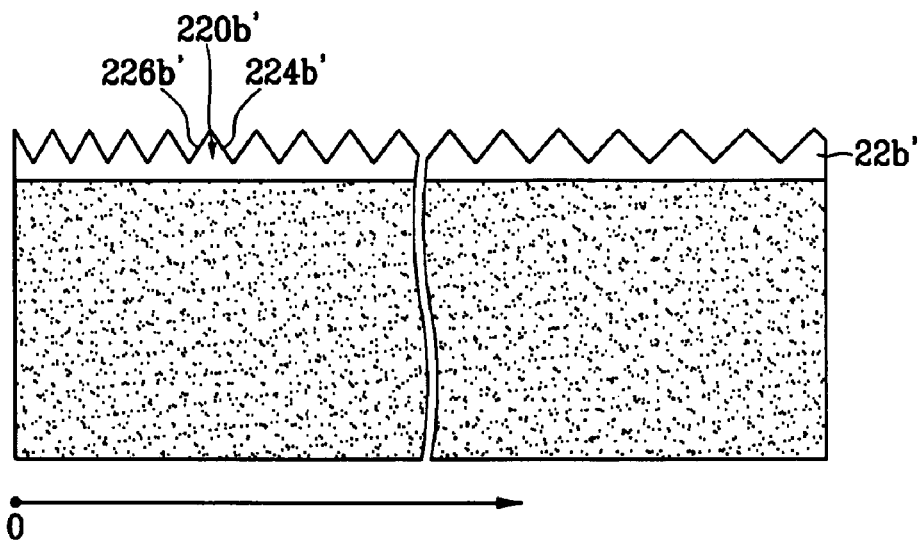
FIGS. 6 and 7 are plane views of positive electrodes in accordance with other embodiments of the present invention.
Figure 7:
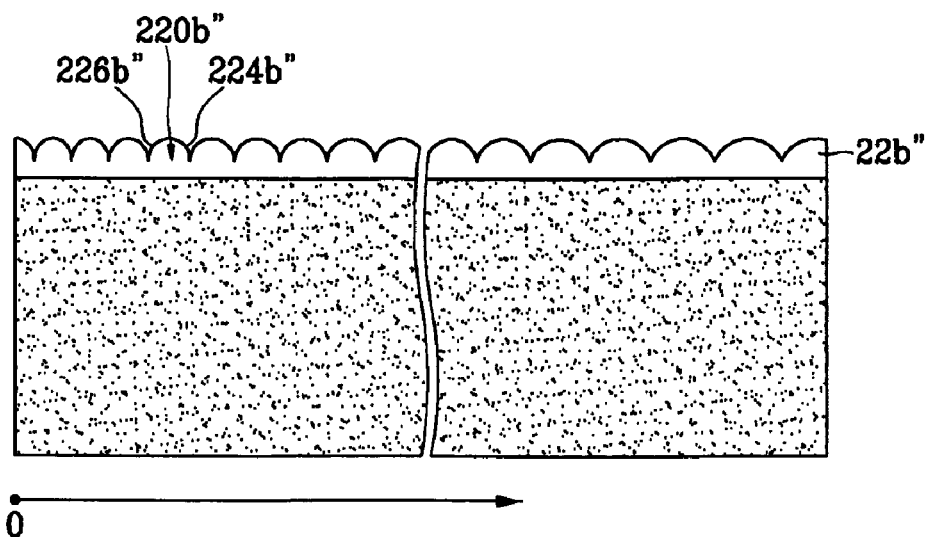

FIGS. 6 and 7 are plane views of positive electrodes in accordance with another embodiment of the present invention. In this embodiment, the independent regions 220b are formed in convex and concave patterns.

The convex and concave patterns of the independent regions are described below taking an example of a positive electrode for the sake of convenience in the description of FIGS. 6 and 7.

In accordance with the present embodiment, the independent regions 220'b and 220"b are formed in as concave shaped 224'b and 224"b and convex shapes 226'b and 226'b formed at the line end of the un-coated regions 22'b and 22"b.

In other words, the concave regions 224'b and 224"b and the convex regions 226'b and 226"b are formed in the un-coated regions 22'b and 22"b in the present embodiment. Due to the concave regions 224'b and 224"b, the convex regions 226'b and 226"b become independent bodies and they are used as independent regions 220'b and 220"b. FIG. 6 shows the convex regions 226'b formed in an angled shape such as triangle, while FIG. 7 shows the convex shapes 226"b formed in a round shape such as half-moon.

Since the pattern and function of the independent regions 220'b and 220"b are the same as that described above, a detailed description of them has been omitted herein.

In accordance with the present invention, the contact area between the current collecting plate and the electrode assembly is widened to thereby reduce the contact resistance, while increasing the current collecting efficiency to the contrary.

The secondary battery according to an embodiment of the present invention is useful as the power source for driving a motor which is used for high power electrical devices that requires high power such as electric vehicles, hybrid electric vehicles, cordless vacuum cleaners, motorbikes, and motor scooters.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A secondary battery, comprising:
   a case;
   an electrode assembly including a positive electrode, a negative electrode, and a separator interposed therebetween, the electrode assembly being arranged within the case;
   a cap assembly affixed to the case and adapted to seal the case, the cap assembly being electrically connected to the electrode assembly; and
   a pair of current collecting plates adapted to be respectively electrically connected to the positive and negative electrodes;
   wherein each electrode includes an un-coated region absent an active material, the un-coated region of each electrode contacting its respective current collecting plate; and
   wherein each un-coated region includes a plurality of independent regions separated from one other, the plurality of independent regions being bent and affixed to their respective current collecting plate,
   wherein the independent regions comprise convex and concave portions arranged in a line end of their respective un-coated region in a longitudinal direction of the un-coated region.

2. The secondary battery of claim 1, wherein the widths of the independent regions become gradually wider from one side of the respective electrode to the other side of the electrode in the longitudinal direction of the electrode.

3. The secondary battery of claim 2, wherein the widths of the independent regions are narrower in a central area of the electrode assembly than in an outer part of the electrode assembly.

4. The secondary battery of claim 1, wherein the convex portions comprise an angled shape.

5. The secondary battery of claim 1, wherein the convex portions comprise a round shape.

* * * * *